(12) United States Patent
Litz et al.

(10) Patent No.: US 10,875,787 B2
(45) Date of Patent: *Dec. 29, 2020

(54) RADIUM REMOVAL FROM AQUEOUS MEDIA USING ZEOLITE MATERIALS

(71) Applicant: WRT INTERNATIONAL LLC, Arvada, CO (US)

(72) Inventors: John E. Litz, Lakewood, CO (US); Charles S. Williams, Golden, CO (US)

(73) Assignee: WRT INTERNATIONAL LLC, Arvada, CO (US)

( * ) Notice: Subject to any disclaimer, the term of this patent is extended or adjusted under 35 U.S.C. 154(b) by 112 days.

This patent is subject to a terminal disclaimer.

(21) Appl. No.: 15/913,263

(22) Filed: Mar. 6, 2018

(65) Prior Publication Data
US 2018/0194643 A1    Jul. 12, 2018

Related U.S. Application Data

(63) Continuation of application No. 14/482,920, filed on Sep. 10, 2014, now Pat. No. 9,908,788, which is a (Continued)

(51) Int. Cl.
*C02F 1/42* (2006.01)
*C02F 1/00* (2006.01)
(Continued)

(52) U.S. Cl.
CPC ............ *C02F 1/008* (2013.01); *C02F 1/281* (2013.01); *C02F 1/42* (2013.01);
(Continued)

(58) Field of Classification Search
CPC .. C02F 1/008; C02F 1/281; C02F 1/42; C02F 2101/006; C02F 2301/04; C02F 2303/14;
(Continued)

(56) References Cited

U.S. PATENT DOCUMENTS 2,368,574 A * 1/1945 Shoemaker ............... C02F 1/42
210/672
2,412,328 A   12/1946 Felsecker
(Continued)

OTHER PUBLICATIONS

Kosarek, Louis J., "Radionuclide removal from water", May 1979, Environmental Science & Technology, vol. 13, No. 5, 522-525, 4 pages. (Year: 1979).*

(Continued)

*Primary Examiner* — Matthew O Savage
(74) *Attorney, Agent, or Firm* — Dorsey & Whitney LLP (57) ABSTRACT

Systems and methods are provided for the removal and disposal of radium form an aqueous medium. The systems and methods include the removal of radium from a source by contact with either natural or synthetic zeolite. The spent zeolite is monitored for radiation levels and replaced with fresh zeolite when the level of radioactivity reaches approximately 9,000 pCi/g. Spent zeolite is disposed of at a low-level radioactive waste site. A system for monitoring and maintaining radium removal and disposal by an off-site provided is also disclosed.

11 Claims, 5 Drawing Sheets

Related U.S. Application Data continuation of application No. 13/180,272, filed on Jul. 11, 2011, now abandoned, which is a continuation of application No. 10/256,853, filed on Sep. 26, 2002, now abandoned.

(60) Provisional application No. 60/325,283, filed on Sep. 26, 2001.

(51) Int. Cl.
   *C02F 1/28* (2006.01)
   *C02F 101/00* (2006.01)

(52) U.S. Cl.
   CPC .... *C02F 2101/006* (2013.01); *C02F 2301/04* (2013.01); *C02F 2303/14* (2013.01)

(58) Field of Classification Search
   CPC .... B01D 24/18; B01D 24/183; B01D 24/186; B01J 39/02; B01J 39/14
   See application file for complete search history.

(56) References Cited

U.S. PATENT DOCUMENTS

| | | | |
|---|---|---|---|
| 2,632,720 A | 3/1953 | Perry | |
| 2,752,309 A | 6/1956 | Emmons et al. | |
| 2,982,605 A | 5/1961 | Pierre et al. | |
| 3,700,592 A | 10/1972 | Pree | |
| 3,723,308 A | 3/1973 | Breck | |
| 3,815,747 A * | 6/1974 | Clack | C02F 1/42 210/140 |
| 3,933,631 A | 1/1976 | Adams | |
| 4,009,102 A | 2/1977 | Davis | |
| 4,265,634 A | 5/1981 | Pohl | |
| 4,339,414 A | 7/1982 | Moore | |
| 4,375,568 A | 3/1983 | Izod et al. | |
| 4,389,293 A | 6/1983 | Mani et al. | |
| 4,445,443 A | 5/1984 | Stewart et al. | |
| 4,475,772 A | 10/1984 | Jan | |
| 4,606,895 A | 8/1986 | Paul | |
| 4,659,460 A * | 4/1987 | Muller | B01D 15/00 210/237 |
| 4,686,198 A | 8/1987 | Bush et al. | |
| 4,695,387 A | 9/1987 | Berry et al. | |
| 4,765,779 A | 8/1988 | Organ | |
| 4,800,024 A | 3/1989 | Elfline | |
| 4,995,956 A | 2/1991 | Mani | |
| 5,043,072 A | 8/1991 | Hitotsuyanagi et al. | |
| 5,055,674 A | 10/1991 | Kotrappa | |
| 5,078,889 A | 1/1992 | Higgins et al. | |
| 5,084,184 A | 1/1992 | Burns | |
| 5,200,046 A | 4/1993 | Chlanda et al. | |
| 5,207,914 A | 5/1993 | Lin | |
| 5,250,187 A | 10/1993 | Franks | |
| 5,268,107 A | 12/1993 | Hutchings et al. | |
| 5,322,644 A | 6/1994 | Dunn et al. | |
| 5,348,659 A | 9/1994 | Kunz et al. | |
| 5,512,178 A | 4/1996 | Dempo | |
| 5,547,585 A | 8/1996 | Shepherd et al. | |
| 5,556,545 A | 9/1996 | Volchek et al. | |
| 5,575,919 A | 11/1996 | Santina | |
| 5,591,346 A | 1/1997 | Etzel et al. | |
| 5,595,666 A | 1/1997 | Kochen et al. | |
| 5,622,630 A | 4/1997 | Romano | |
| 5,622,632 A | 4/1997 | Gallup | |
| 5,651,883 A | 7/1997 | Horwitz et al. | |
| 5,679,256 A | 10/1997 | Rose | |
| 5,695,642 A | 12/1997 | Greenleigh et al. | |
| 5,707,514 A | 1/1998 | Yamasaki et al. | |
| 5,711,015 A | 1/1998 | Tofe | |
| 5,725,753 A | 3/1998 | Harada et al. | |
| 5,733,434 A | 3/1998 | Harada et al. | |
| 5,798,040 A | 8/1998 | Liang | |
| 5,876,685 A | 3/1999 | Krulik et al. | |
| 5,951,874 A | 9/1999 | Jangbarwala et al. | |
| 6,042,731 A | 3/2000 | Bonnin | |
| 6,200,482 B1 | 3/2001 | Winchester et al. | |
| 6,332,110 B1 | 12/2001 | Wolfe | |
| 6,387,274 B1 | 5/2002 | Hendricks et al. | |
| 6,531,063 B1 | 3/2003 | Rose | |
| 6,582,605 B2 | 6/2003 | Krulik et al. | |
| 6,583,081 B2 | 6/2003 | Seff | |
| 6,613,230 B2 | 9/2003 | Krulik et al. | |
| 6,663,781 B1 | 12/2003 | Huling et al. | |
| 6,753,186 B2 | 6/2004 | Moskoff | |
| 6,843,920 B1 | 1/2005 | Darmawan | |
| 6,849,187 B2 | 2/2005 | Shaniuk | |
| 7,025,887 B1 | 4/2006 | Kirts et al. | |
| 7,105,087 B2 | 9/2006 | Litz | |
| 7,108,784 B1 | 9/2006 | Williams et al. | |
| 7,261,811 B2 | 8/2007 | Nakhia et al. | |
| 7,326,347 B2 | 2/2008 | Williams et al. | |
| 7,326,348 B2 | 2/2008 | Litz et al. | |
| 7,332,073 B2 | 2/2008 | Johnson | |
| 7,371,326 B2 | 5/2008 | Dale | |
| 7,390,414 B2 | 6/2008 | Williams et al. | |
| 7,476,311 B2 | 1/2009 | Litz et al. | |
| 7,520,987 B1 | 4/2009 | Williams et al. | |
| 7,713,424 B2 | 5/2010 | Williams et al. | |
| 7,807,057 B2 | 10/2010 | Williams et al. | |
| 8,663,479 B2 | 3/2014 | Litz et al. | |
| 2003/0132155 A1 | 7/2003 | Litz et al. | |
| 2004/0020870 A1 | 2/2004 | Amburgey | |
| 2004/0124150 A1 | 7/2004 | Litz | |
| 2005/0150836 A1 | 7/2005 | Williams | |
| 2005/0222481 A1 | 10/2005 | Johnson | |
| 2005/0236333 A1 | 10/2005 | Williams et al. | |
| 2005/0258102 A1 | 11/2005 | Litz et al. | |
| 2007/0215552 A1 | 9/2007 | Williams et al. | |
| 2008/0128359 A1 | 6/2008 | Litz et al. | |
| 2009/0236289 A1 | 9/2009 | Williams et al. | |

OTHER PUBLICATIONS

Park et al, An Approach to Low-Level Liquid Radwaste Treatment by Ion Exchange, Jan. 1997, [online], [retrieved on Nov. 24, 2016]. Retrieved from the internet . (Year: 1997).*
Abdo, et al., "A new technique for removing hexavalent chromium from waste water and energy generation via galvanic reduction with scrap iron", Energy Conservation and Management, vol. 39, No. 9, Abstract, 943-951.
Ames, L. L. "Zeolitic Removal of Ammonium Ions from Agricultural and Other Wastewaters", 13th Pacific Northwest Industrial Waste Conference, Washington State University, 135-152.
Arnold, et al., "Radium Removal From Uranium Mill Effluents with Inorganic Ion.Exchangers," I&EC Process Design and Development, Jul. 1965, pp. 333-337, vol. 4, No. 3.
Barrado, et al., "Characterisation of solid residues obtained on removal of Cr from waste water", Journal of Alloys and Compounds, vol. 335, Abstract, 203-209.
Bishop, D. F. et al., "Physical-Chemical Treatment of Municipal Wastewater", Journal of Water Pollution Control Federation, vol. 44, No. 3, 361-371.
Brinck, William L. et al., "Radium-Removal Efficiencies in Water-Treatment Processes", Water Technology Quality; American Water Work Association Journal, Jan. 1978, pp. 31-35.
Çelik, M. S. et al., "Removal of Ammonia by Natural Clay Minerals Using Fixed and Fluidised Bed Column Reactors", Water Science and Technology: Water Supply, vol. 1, No. 1, 81-88.
Chmielewska-Horváthová, E. "Advanced Wastewater Treatment Using Clinoptiloite", Environment Protection Engineering, vol. 22, Issue 1-2, 15-22.
Chmielewska-Horváthová, E. "Use of Clinoptiloite in Ammonia Removal from Wastewater in and Outside Slovakia", Mineralia Slovavaca, vol. 27, No. 4, pp. 268-272, 1995, 5 Pages.
Cole, et al., "Radium Removal from Groundwater by ION Exchange Resin," Water Quality Association (8 pages).
Cooney, E. L. et al., "Ammonia Removal from Wastewaters Using Natural Australian Zeolite. II Pilot-Scale Study Using Continuous Packed Column Process", Separation Science and Technology, vol. 34, Issue 14, 2741-2760.

(56) References Cited

OTHER PUBLICATIONS

DOWEX RSC, "Radium Removal from Groundwater with DOWEX RSC Radium Selective Complexer Resin", DOWEX Ion Exchange Resins, http://www.dow.com/liquidseps, 2 pages.

Fazullina, et al., "Removal of chromium compounds in the process of coagulation treatment of wool industry dyeing-finishing plant waste water", Soviet Journal of Water Chemistry and Technology, vol. 10, No. 5, Abstract, 85-88.

Hagiwara, Z. et al., "Ion-Exchange Reactions of Processed Zeolite and Its Application to the Removal of Ammonia-Nitrogen in Wastes", Natural Zeolites: Occurrence, Properties, Use, International Conference on the Occurrence, Properties, and Utilization of Natural Zeolites, Tucson, Arizona, Pergamon Press, 463-470.

Han, Ihn S. "Environmental engineering parameters affecting the removal of hexavalent chromium and nitroaromatic compounds from water by granular activated carbon", Thesis, 178 pages; Abstract.

Haralambous, A. et al., "The Use of Zeolite for Ammonium Uptake", Water Science and Technology Journal, vol. 25, No. 1, 139-145.

Hayhurst, D. T. "The Potential Use of Natural Zeolites for Ammonia Removal During Coal-Gasification", Natural Zeolites: Occurrence, Properties, Use, International Conference on the Occurrence, Properties, and Utilization of Natural Zeolites, Tucson, Arizona, Pergamon Press, 503-507.

Jørgensen, S.E. "Ammonia Removal by Use of Clinoptilolite", Water Research, vol. 10, 213-224.

Kalló, D. "Wastewater Purification in Hungary Using Natural Zeolites", Natural Zeolites '93, International Committee Natural Zeolites, Brockport, New York, 341-350.

Kiser, Jon R. et al., "Reduction and immobilization of chromium(VI) by iron(II)-treated faujasite", Journal of Hazardous Materials, vol. 174, 2010, pp. 167-174.

Klieve, J. H. et al., "An Evaluation of Pretreated Natural Zeolites for Ammonium Removal", Water Research—The Journal of the International Association on Water Pollution Research, vol. 14, No. 2, Pergamon Press, 161-168.

Koon, J. H. et al., "Ammonia Removal from Municipal Wastewaters by Ion Exchange", Journal Water Pollution Control Federation, vol. 47, No. 3, 448-465.

Koon, J. H. et al., "Optimization of Ammonia Removal by Ion Exchange Using Clinoptilolite", SERL, Report No. 71-5, University of California, Berkeley, California, 1-189.

Kosarek, Louis J. "Radionuclide removal from water", Environmental Science & Technology, vol. 13, No. 5, 522-525.

Kutsy, "The Removal of Co2+ ' Ni2+ ' Cu2+ ' Zn2+ ' Mn2+ ' Fe3+ and Cr6+ out of Water Solutions by Phosphates of Metals", Ekotekhnologii I Resursosberezhenie, Part 1, pp. 42-46, English Abstract, 2002, 5 Pages.

Lin, et al., "The removal of hexavalent chromium from water by ferrous sulfate", Hazardous and insdustrial wastes: Proceedings of the twenty-seventh Mid-Atlantic industrial waste conference, Technomic Publishing Co., Inc., Lancaster, PA, Abstract.

McLaren, J. R. et al., "Factors Affecting Ammonia Removal by Clinoptilolite", Journal of the Environmental Engineering Division, ASCE, vol. 1973, 429-444.

Melitas, et al., "Kinetics of soluble chromium removal from contaminated water by zero valent iron media: corrosion inhibition and passive oxide effects", Environmental Science Technology, vol. 35, No. 19, Abstract, 3948-3953.

Mercer, B. W. "Ammonia Removal from Secondary Effluents by Selective Ion Exchange", Journal Water Pollution Control Federation, vol. 42, No. 2, R95-R107.

Mercer, B. W. "Clinoptilolite in Water-Pollution Control", The Ore Bin, vol. 31 No. 11, 209-213.

Park, et al., "N Approach to Low-Level Liquid Radwaste Treatment by Ion Exchange", [Retrieved on Nov. 24, 2016]; Retrieved from the internet <URL:http//www.wmsym.org/archives/1997/sess13/13-06.htm>;, Jan. 1997 [Online], 7 Pages.

Philipot, et al., "Hexavalent Chromium Removal from Drinking Water", Water Science and Technology, vol. 17, No. 6/7, Abstract, 1121-1132.

Qin, Gang et al., "Hexavalent Chromium Removal by Reduction with Ferrous Sulfate, Coagulation, and Filtration: A Pilot-Scale Study", Environ. Sci. Technol., vol. 39, 2005, pp. 6321-6327.

Sarre, et al., "Chromium removal in water by modified cellulose", Journal of Water Science, vol. 1, No. 1-2, Abstract, 55-71.

Semmens, M. J. "Ammonium Removal by Clinoptilolite Using Biologically Assisted Regeneration", 5th International Conference on Zeoliltes, Naples, Florida, 795-804.

Semmens, M. J. et al., "Ammonium Removal by Ion Exchange: Using Biologically Restored Regenerant", Journal of Water Pollution Control Federation, vol. 51, Issue 12, 2928-2940.

Semmens, M. J. et al., "Biological Regeneration of Ammonium-Saturated Clinoptilolite. II The Mechanism of Regeneration and Influence of Salt Concentration", Environmental Science & Technology, vol. 11, 260-265.

Semmens, M. J. et al., "Clinoptilolite Column Ammonia Removal Model", Journal of the Environmental Engineering Division, Proceedings of the American Society of Civil Engineers, vol. 104, No. EE2, 231-244.

Semmens, M. J. et al., "Nitrogen Removal by Ion Exchange: Biological Regeneration of Clinoptilolite", Journal of the Water Pollution Control Federation, vol. 49, No. 12, 2431-2444.

Semmens, M. J. et al., "The Regeneration of Clinoptilolite by Biologically Restored Brine", University of Illinois, Water Resources Center, Research Report No. 139, 1-1 through C-10.

Sengupta, "Removing Uranium and Radium from Groundwater by Ion Exchange Resins", Ion Exchange Technology; Technomic Publishing Co., 1995, pp. 28-52.

Slechta, A. F. et al., "Water Reclamation Studies at th South Lake Tahoe Public Utility District", Journal of the Water Pollution Control Federation, vol. 39, 787-814.

Smith, S. A. et al., "Tahoe-Truckee Water Reclamation Plant. First Year Review", Water Reuse Symposium, vol. 2, 1435-1445.

Svetich, Richard "Long-Term Use of Clinoptilolite in the Treatment of Sewage at Tahoe-Truckee Sanitation Agency, Truckee, California", Natural Zeolites: Occurrence, Properties, Use, International Conference on the Occurrence, Properties, and Utilization of Natural Zeolites, Red Lion Hotel-Riverside, Boise, Idaho, 197-201.

Townsend, R. P. et al., "Ion Exchange Properties of Natural Clinoptilolite, Ferrierite and Mordenite: 1. Sodium-Ammonium Equilibria", Zeolites, vol. 4, No. 2, 191-195.

U.S. Envir. Prot. Agcy., "Determination of Radium Removal Efficiencies in Iowa Water Supply Treatment Processes", Office of Radiation Programs, Jun. 1976, 213 pages.

U.S. Envir. Prot. Agcy., "Manual of Treatment Techniques for Meeting the Interim Primary Drinking Water Regulations", Office of Research and Development; Municipal Envir. Research Lab.; Water Supply Research Div. Cincinnati, OH, May 1977, 79 pages.

U.S. Envir. Prot. Agcy., "Suggested Guidelines for the Disposal of Drinking Water Treatment Wastes Containing Naturally Occurring Radionuclides", Office of Drinking Water, Jul. 1990, 68 pages.

Werkema, R. G. et al., "Uranium Recovery from Magnesium Fluoride Slag", Carbonate Leaching; vol. 50 No. 12, Dec. 1958, pp. 1781-1784.

Wohlsen, T. et al., "Evaluation of Five Membrane Filtration Methods for Recovery of Cryptosporidium and Giardia Isolates from Water Samples", Applied and Environmental Microbiology; vol. 70, No. 4, Apr. 2004, pp. 2318-2322.

* cited by examiner

RADIUM REMOVAL FROM AQUEOUS MEDIA USING ZEOLITE MATERIALS

CROSS REFERENCE TO RELATED APPLICATIONS

This application is a continuation of U.S. patent application Ser. No. 14/482,920, filed Sep. 10, 2014, which is a continuation of Ser. No. 13/180,272, filed on Jul. 11, 2011, which is a continuation of U.S. patent application Ser. No. 10/256,853, filed Sep. 26, 2002, entitled RADIUM REMOVAL FROM AQUEOUS MEDIA USING ZEOLITE MATERIALS, which claims priority to U.S. Provisional Application Ser. No. 60/325,283, filed on Sep. 26, 2001, entitled RADIUM REMOVAL FROM AQUEOUS MEDIA USING ZEOLITE MATERIALS, all of which are incorporated by reference herein.

FIELD OF THE INVENTION

The invention generally relates to the removal of radium from aqueous media. More specifically, the invention provides systems and methods for cost effectively removing radium from water as it is treated in a water treatment facility, and in particular, to systems and methods for the removal and disposal of radium from drinking water by contacting the water with zeolite materials before or after the water has been treated in a water treatment facility, and monitoring and disposing of the radium at a low-level waste facility.

BACKGROUND OF THE INVENTION

Cities and towns throughout the world depend on having clean potable water supplies. The dependence on clean water has increased as the population of the world has increased, especially as industrial use of rivers and lakes have become commonplace.

The explosion of world population, and corresponding increase in fresh water use, has resulted in a need to maximize water usage. However, the ability to maximize fresh water use has been limited by, (1) increased pollution of the fresh water supplies due to higher industrial output throughout the world (a direct result of the increased population); and (2) increased knowledge and standards for what constitutes clean water, acceptable for use in farming, industry, and consumption. As a result, there is a current need to increase the efficiency in the use of water, i.e., conserve existing clean water supplies, increase the current capabilities used to remove pollutants from water supplies, and increase the effectiveness of existing and new technologies to effectively treat and reach new standards in water quality.

In this light, radium, a radioactive metal that occurs naturally in rocks, soils, and ground water, has become of concern to the water supplies of many population centers throughout the world, and in particular, portions of the world where the metal is found in high concentrations, e.g., Midwestern portions of the United States, Canada, Zaire, France and portions of Russia. Of particular importance to these areas of high radium concentration, is the fact that radium readily dissolves in the acidic environment of ground water, and is often found as a major natural pollutant in these water supplies.

Radium, an element of group IIA of the periodic table, having 14 radioactive isotopes, continuously releases energy into the environment until a stable, non-radioactive material is formed. Conversion of radium, for example radium-226, to a stable, non-radioactive element, for example lead-206, occurs by radioactive decay, for example, through the emission of alpha-particles. During the process, other radioactive isotopes, for example radon-222, form from the original radium. Radium-226 has a half-life of 1,620 years, an indication that the isotope, once in the water supply, will remain radioactive in the water supply until removed (for all practical purposes). In addition, it is important to note that radioactivity is not dependent on the physical state or chemical combination of the material, requiring a radioactive material to be physically removed from the water supply in order to free it of the radioactivity.

The level of radioactivity in a water supply is determined by measuring the different characteristics of energy released within the water. Radioactivity is usually measured in units called "curries" (Ci), and its metric multiplies and fractions, for example, the mega, kilo, milli, micro, and picocurrie. It is well established that a curie is $3.37 \times 10^{10}$ disintegrations per second. With regard to drinking water, radioactivity is extremely low and is measured in picocurries (one picocurrie equals one-trillionth of a curie) per liter (pCi/L) or gram (pCi/g) of tested material.

There are several known steps used in determining the level of radium in a water supply. Typically, the first step is to perform a "short-term gross alpha test" (gross meaning total) on a sample of the water supply. Most naturally occurring radioactive elements, like radium, emit alpha particles as they decay, and radium is no exception. Detection of alpha particles in the water signals the presence of specific radioactive substances, and provides a signal that further testing may be required, and that radium is likely present in the water supply (although other alpha emitting radioactive materials may be present in the water, radium represents a major element of concern due to its widespread distribution, especially in the regions of the world discussed above).

The United States Environmental Protection Agency (EPA) has established Maximum Contaminant Levels (MCL) for combined radium-226 and radium-228, and for other gross alpha emissions in drinking water. These MCL are based on current standards of safety with regard to alpha radiation, based on the relative risk of the emissions to the safety of the consuming population of the water. As such, the MCL represents the maximum permissible level of, in this case alpha emissions, that ensures the safety of the water over a lifetime of consumption, taking into consideration feasible treatment technologies for removing radium and other alpha emitters from the water and for monitoring capabilities of these same materials. The MCL for combined radium-226 and radium-228 is 5 pCi/L of water. In addition, the MCL for gross alpha in drinking water is 15 pCi/L (note that specific MCLs for radium-224 or other specific alpha emitters have not been established).

Presently, there are a number of water sources that violate the EPA's MCL for radium. This remains the case eventhough these water sources are processed through state of the art water treatment facilities. For example, as of May of 2001, approximately 200 water treatment facilities in a 20 state area were in violation of the mandated MCL for radium. In particular, Illinois had almost 100 facilities in violation of the EPA's standards. It is believed that the number of radium standard violations is likely to reach 250 to 300 facilities once a more comprehensive determination of radium levels is performed throughout the United States.

Presently, drinking water treatment facilities in the United States are searching for ways to lower radium levels to comply with the MCL (this applies world wide as well where many countries are attempting to lower radium levels in the drinking water supplies) in a cost effective manner. State of the art solutions include point-of-use technologies, such as reverse osmosis or carbon absorption filters. Larger scale solutions include relatively expensive ion-exchange resins that require the spent resins to be recovered and the radium to be isolated from the resin and disposed of in highly concentrated fashions, i.e., high-level waste. As is well known in the art, high-level waste must be disposed of at highly regulated licensed sites, at exorbitant cost.

As such, there is a need for a radium removal system from water that is relatively inexpensive and allows for the disposal of the collected radium at low-level radioactive waste sites. Note that low-level waste sites typically are characterized as receiving waste having less than 10,000 pCi/g in the material. The inability to remove radium in a condition for low-level radioactivity disposal has traditionally been a major drawback of existing radium removal technology. Against this backdrop the present invention was developed.

BRIEF SUMMARY OF THE INVENTION

The present invention provides systems and methods for the removal of radium from an aqueous medium using the exchange properties of either natural or synthetic zeolites. The zeolites of the present invention absorb radium at levels sufficient to comply with the current MCL for drinking water, as promulgated by the Environmental Protection Agency. Spent zeolites are monitored for radium levels and are replaced and disposed of when the radioactivity of the material is from about 9,000 pCi/g to 9,999 pCi/g, thereby allowing for disposal at low-level radioactive waste sites.

The present invention also provides a system for operating a radium removal facility, in accordance with the present invention, from an off-site location. The system includes providing an amount of zeolite for removal of radium from the water source, monitoring the zeolite and water source for radium levels, modifying the amount of zeolite to correspond to a target level of radium in the water source, after the water source has contacted the zeolite, and disposing of an amount of zeolite in a low-level radioactive waste site when the monitored levels of radium reach a pre-determined level, for example 9,999 pCi/g.

These and various other features as well as advantages which characterize the invention will be apparent from a reading of the following detailed description and a review of the appended claims.

DETAILED DESCRIPTION OF THE INVENTION

Definitions:

The following definitions are provided to facilitate understanding of certain terms used frequently herein and are not meant to limit the scope of the present disclosure.

"Aqueous medium" refers to water or any liquid made from, with, or by water.

"Feed" refers to an aqueous medium before treatment with the systems and methods of the present invention, for example, a flowing water source before it enters a water treatment facility.

"Radium" or "Ra" refers to, in general, the radioactive element of group IIA of the periodic table having atomic number 88 and a valence of 2. The term radium, in accordance with the present invention, includes any of the 14 known radioactive isotopes of radium, including, radium-224, radium-226, and radium-228.

"Maximum Contaminant Level" is the highest level of contamination that is allowed in drinking water in the United States, taking into account best treatment technology and cost. These standards are typically enforceable. Note that Maximum Contaminant Level standards are envisioned to encompass or correspond to the same approximate standards in countries outside the United States, and in may cases are enforceable in those countries. The MCL for combined radium-226 and radium-228 is 5 pCi/L.

"Zeolite" refers to a natural and/or synthetic zeolite. Natural zeolites are hydrated silicates of aluminum and either sodium or calcium or both, for example clinoptilolite and chabazite. Synthetic zeolites are made by a number of well known processes, for example gel or clay processes, which form a matrix to which the zeolite is added. Example synthetic zeolites include Linde® AW-30 and Zcolon® 900.

"Low-level waste" refers to any waste having a radioactivity of less than 10,000 pCi/g.

"High-level waste" refers to any waste having a radioactivity equal to or above 10,000 pCi/g.

"Radium measuring device" refers to any detection device having the capacity to measure the radioactive decay of radium, or in some instances, the spectral analysis of radium "Remove" refers to the detectable decrease of a target material, for example radium, from a source, for example ground water. Typically removal of radium from an aqueous source is at least 50%, preferably at least 75% and most preferably at least 90%, from the original levels in the zeolite treated source.

"Absorb" and "adsorb" refer to the same basic principle of one substance being retained by another substance. The processes can include attraction of one substance to the surface of another substance or the penetration of one substance into the inner structure of another substance. The present invention contemplates that zeolite can either absorb and/or adsorb radium out of an aqueous medium and that for purposes of the present invention, that the two principles be interchangeable. Other terms used to describe this interaction include binding or trapping, each of which are considered interchangeable with "absorb" for purposes of the present invention.

Zeolite:

Zeolites, in accordance with the present invention, effectively absorb, adsorb, bind and/or trap radium in an aqueous media, and thereby remove radium from aqueous media. Compositionally, zeolites are similar to clay minerals, where zeolites are natural hydrated silicates of aluminum and either sodium or calcium or both. Unlike clays, which have a layered crystalline structure (similar to a dock of cards that is subject to shrinking and swelling as water is absorbed), zeolites have a rigid three-dimensional crystalline structure. Zeolites' rigid honeycomb-like crystalline structure consists of a network of interconnected tunnels and cages, thereby forming a series of substantially uniformly sized pores. Aqueous media moves freely in and out of the pores formed by the crystalline structure, making zeolite an excellent sieving or filtration type material, as well as providing a large surface area for binding radium within the target aqueous medium. Zeolite is host to water molecules and ions of potassium, sodium, and calcium, as well as a variety of other positively charged ions, but only those of appropriate molecular size fit into the pores, creating the "sieving" property.

There are approximately fifty different types of natural zeolites, including clinoptilolite, chabazite, phillipsite, mordenite, analcite, heulandite, stilbite, thomosonite, brewsterite, wellsite, harmotome, leonhardite, eschellite, erionite, epidesmine, and the like. Differences between the different zeolites include particle density, cation selectivity, molecular pore size, and cation affinity. For example, clinoptilolite, the most common natural zeolite, has 16% more void volume and pores as much as 0.2 nm larger than analcime, another common zeolite.

Preferable natural zeolites for use in the present invention include any zeolite having a cationic exchange capacity with sufficient capacity to lower the radium concentration in an aqueous medium from a first level to a second level. For example, natural zeolites of the present invention act as radium exchange materials having an affinity for radium in an aqueous medium, e.g., groundwater. In addition, zeolites having particle sizes from 10×60 mesh, and preferably 20×40 mesh are useful in the present invention. Zeolite fines are typically removed before use in the present invention to prevent plugging in the tanks of the present invention (see below). Preferable natural zeolites for use in the present invention include clinoptilolite. Note that other sized zeolites could be used in the present invention, although they would likely be less effective for their intended use.

Tables 1 and 2 provide a list of companies that presently produce zeolite minerals in either the United States or Canada. Table 1 provides a chemical analysis of the companies' zeolite materials, and Table 2 provides the physical properties of the corresponding zeolite materials. This Table is provided as illustrative of the type of zeolite material that can be purchased for large scale use.

TABLE 1

Chemical Analysis (Expressed in Weight %)

| Company | Location | $Na_2O$ | $K_2O$ | CaO | MgO | $SiO_2$ | $Al_2O_3$ | $TiO_2$ | $Fe_2O_3$ |
|---|---|---|---|---|---|---|---|---|---|
| Addwest Minerals | WY | 4.7 | 1.9 | 1.6 | 0.65 | 74.0 | 14.0 | 0.1 | 2.1 |
| American Research | NV/CA | 3.5 | 3.8 | 0.7 | 0.4 | 69.1 | 11.9 | — | 0.74 |
| Am. Absorbents | OR | 0.8 | 3.8 | 0.7 | 0.4 | 69.1 | 11.9 | 0.2 | 0.7 |
| Stellhead Res. | CA/NM/OR | 0.8 | 3.8 | 0.7 | 0.4 | 69.1 | 11.9 | 0.2 | 0.4 |
| Teague Minerals | OR | 0.9 | 4.7 | 1.4 | 0.3 | 64.1 | 11.8 | 0.3 | 2.58 |
| Zeotech | TX | 0.6 | 1.7 | 2.4 | 0.7 | 68.4 | 12.1 | NK | NK |
| St. Cloud Mining | NM | 0.9 | 3.3 | 3.3 | 1.0 | 64.7 | 12.6 | 0.2 | 1.8 |
| W-Way Zeolites | Canada | 2.5 | 2.7 | 3.4 | 1.3 | 65.8 | 14.3 | 0.3 | 2.6 |
| Highwood Res | Canada | 2.78 | 2.79 | 3.78 | 0.95 | 64.5 | 13.7 | 0.27 | 2.19 |
| C2C Mining | Canada | 1.35 | 1.57 | 2.51 | 1.55 | 66.8 | 11.2 | 0.6 | 5.2 |

TABLE 2

Physical Properties

| Company | Ionic Exch Capacity (meq/g) | $H_2O$ % Adsorp. | Free Silica (%) | SG | Color | pH (nat.) | Pore Diam. (Å) | Hard |
|---|---|---|---|---|---|---|---|---|
| Addwest Minerals | 2.00 | 14.0 | 2.00 | 1.5 | pale blue | | 4.4 | 3.7 |
| American Research | 1.85 | 12.3 | NK | NK | | | 4.0 | 5.1 |
| Am. Absorbents | 1.4 | | 1.50 | 2.3 | white | 8.0 | 4.0 | 3.8 |
| Stellhead Res. | 1.30 | | 0.09 | 1.6 | white | 8.0 | 4.0 | 5.1 |
| Teague | 1.77 | | low | 2.2 | off white | | not | not |

TABLE 2-continued

Physical Properties

| Company | Ionic Exch Capacity (meq/g) | H$_2$O % Adsorp. | Free Silica (%) | SG | Color | pH (nat.) | Pore Diam. (Å) | Hard |
|---|---|---|---|---|---|---|---|---|
| Minerals Zeotech | | | | | | | provided | provided |
| St. Cloud Mining | 1.60 | | 0.01< | 2.3 | white | 8.0 | 4.0 | 3.8 |
| W-Way Zeolites | 1.00 | 25.0 | NK | 2.4 | offwhite/ pale green | 8.1 | 6.5 | NK |
| Highwood Res | 1.00 | | 10.0 | 2.0 | | 7.0 | | |
| C2C Mining | NK | NK | 5.00 | 2.3 | brown | 5.0? | NK | NK |

It is also envisioned that synthetic zeolites can be used in accordance with the present invention. Synthetic zeolites are made by well known processes, such as a gel process (sodium silicate and alumina) or clay process (kaolin), which form a matrix to which the zeolite is added. Preferable synthetic zeolites include Linde®AW-30, Linde®AW-500, Linde®4-A and Zeolon®900.

It is envisioned that the systems and methods of the present invention can utilize either natural, synthetic or a mixture of natural and synthetic zeolite in the removal of radium from aqueous medium.

There are numerous well known techniques for contacting an aqueous media with an affinity type resin, like zeolite, in the context of treating large quantities of water. For example, the zeolite, due to its natural sieving properties and resistance to being crushed, provide an excellent column resin, where the aqueous media can move through a bed of zeolite and exit from the bottom of the column or tank. This is considered a down-flow type design. Alternatively; the zeolite can be dispersed within the moving aqueous media, usually due to an up-flow through the tank or column, and additionally being prevented from exiting the column or tank via a filter. Preferably, an up-flow type design is used in embodiments of the present invention.

In general, the process chemistry of zeolite, for example sodium containing zeolite, interacting with radium is as follows:

$$Ra^{2+}Na_2Zeol \rightarrow RaZeol + 2Na^+$$

During contact, radium in the aqueous environment is absorbed by the zeolite material thereby decreasing the concentration of the radium to a second, lower level. Note that from an economic standpoint, the removal of radium by zeolite from a source, for example a drinking water supply, should only be sufficient to satisfy the MCL for that particular water supply, for example 5 pCi/L. Using the methods of the present invention, described below, the second level can be adjusted to correspond to the MCL or slightly below the MCL to ensure radium removal costs are minimized. In addition, the loading of zeolite with radium should be monitored so that "loaded" zeolite is disposed of at low-level radioactive waste sites.

Adjustment of the radium level in a discharged aqueous media can be accomplished in several manners, first, the flow rate of the aqueous media through the zeolite can be modified, thereby increasing or decreasing the retention time of the radium with the zeolite. Second, the amount of aqueous media in the feed can be diverted from contacting the zeolite and blended with the aqueous media passing through and contacting the zeolite. Third, the zeolite can be continuously bled from contacting the aqueous media, for example, an amount of zeolite can be loaded into a column on a regular basis, e.g., once a day, and a like amount systematically removed from the absorption column. The amount of zeolite added to the system can be fresh zeolite or partially loaded zeolite or zeolite having an altered affinity for radium, depending on the desired reduction of concentration of radium in the aqueous medium required. In addition, the amount of zeolite present in contact with the aqueous media can be altered. As expected, removal of an amount of zeolite from contact with the medium will decrease the potential for removing radium from the zeolite.

Radium Removal from Aqueous Medium Using Zeolite

Systems and methods of the present invention are presented for the removal of radium from aqueous media. The systems and methods include the removal of radium from aqueous media using a zeolite based radium affinity and/or filtration column(s). Preferably, the systems and methods of the present invention are utilized in the treatment of water in water treatment facilities, for example for preparing drinking water, and most preferably in the treatment of from 0.2 million gallons per day (MGD) to 40 MGD in a water treatment system used to treat drinking water, where the spent zeolite is continuously disposed of at low-level radioactive waste sites prior to reaching a pre-determined threshold value, for example 9,000-9,999 pCi/g, and new or fresh zeolite added to replace the spent zeolite.

The radium removal systems and methods of the present invention are designed to be incorporated into conventional water treatment systems, and preferably are designed to be incorporated into theses systems as stand-alone units. Typically, the incorporation of the systems and methods of the present invention do not require that the existing system be re-designed, but rather, that the radium removal systems and methods be adapted to function before, during or after the more conventional water treatment. Preferably, embodiments of the radium removal systems and methods of the present invention are added to existing water treatment facilities as a first treatment step. Preferably, embodiments of the present invention remove an amount of radium from a water source to meet the current MCL for radium in the United States, i.e., 5 pCi/L.

In its broadest sense, the present invention is directed toward the extraction or removal of radium from an aqueous media from a first level to a second, lower level. Preferably, the extracted radium loaded zeolite is at a radiation level appropriate for disposal in a low-level waste facility.

Note that for purposes of the present invention, a "first level" of radium is a concentration of radium within an un-treated (un-treated by the systems and methods of the present invention) aqueous medium, preferably drinking water on its way into or out of a conventional water treatment facility. The first level will generally exceed the acceptable discharge limits, or MCL (or its equivalent as set by the appropriate authority in other countries of the world), set by the EPA thereby requiring treatment A "second level" of radium is a concentration within an aqueous solution lower than the acceptable MCL set by the EPA. A "third level" or radium is a concentration within an aqueous medium lower than the "second level." A "discharge level" of radium is the concentration of radium in an aqueous media being discharged from a treatment facility after application of the systems and methods of the present invention. The discharge level of radium is often equal to the second or third levels of radium, but need not necessarily be the case, for example, where additional radium is trapped and thereby removed from the aqueous medium, within the conventional treatment facility, thereby altering the level of radium from the discharge level. The first level of radium is generally higher than the second level of radium, which is higher than the third level of radium. Note also that the concept of a "level" of radium, i.e., first level, second level, third level, etc., in media is envisioned to be an average concentration of radium in the water at the moment of measurement or sampling, and is dynamic and usually in flux throughout the treatment of the water by the systems and methods of the present invention. As such, the first, second, third or discharge level of radium in an aqueous medium are envisioned as average values that may vary over the course of water treatment, as long as it does not violate the properties ascribed above.

The systems and methods of the present invention are adapted for use with existing water treatment plants as a "turn-key" or "bolt-on" process to remove radium from aqueous media. These facilities can be used to improve the quality of aqueous media in, a number of applications, including drinking water, waste water, agricultural water and ground water. In the same manner, the systems and methods of the present invention can be incorporated into new water treatment plant designs, again as "turn-key" or "bolt-on" process to the conventional water treatment facility, or integrated into the facility as designed by one of skill in the art.

Figure 1:
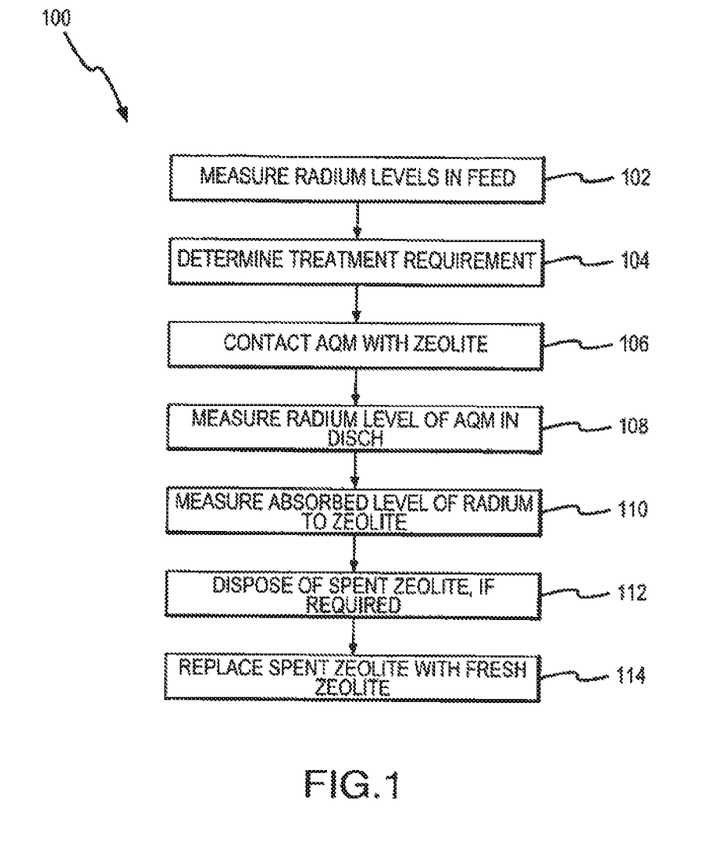
FIG. 1 illustrates a flow diagram of a method for removing radium from an aqueous media in accordance with an embodiment of the present invention.

Referring to FIG. 1, a flow diagram of a method 100 for the removal of radium from aqueous media is shown. In step 102, the level of radium is measured in the aqueous media feed to determine a first level of radium. In step 104, an optional determination can be made as to whether the feed has sufficient radium content to require removal of some or all of the radium from the aqueous media. In cases where the feed has a radium content below a target threshold of radium, the medium is passed directly to the conventional water treatment facility. In cases where the feed requires the removal of radium, the feed is directed to treatment as shown by step 106. In step 106, the aqueous media is placed in contact with a sufficient amount of zeolite for a sufficient amount of time to remove an amount of radium so that the aqueous media has a second level of radium. This step can be repeated so that the aqueous medium having a second level of radium is contacted with a second amount of zeolite to remove an amount of radium, thereby leaving the aqueous media with a third level of radium.

In step 108, the treated aqueous media is discharged from the zeolite and the level of radium is measured, this is the discharge level of radium in the aqueous media. In step 110, the amount of radium absorbed to the zeolite is measured after a pre-determined interval of water has flowed through the zeolite or after a pre-determined amount of time has passed during zeolite use. In step 112, a determination is made as to whether the zeolite is sufficiently laden with radium to require replacement of the spent zeolite with fresh zeolite. Zeolite having between 9,000 pCi/g-10,000 pCi/g is sufficiently laden for disposal at low-level waste sites, in one example. The spent zeolite is disposed of at the appropriate radiation disposal site, i.e., low-level or high-level (where the levels are allowed to exceed 10,000 pCi/L). In preferred aspects of the methods of the present invention, the spent zeolite is replace before the zeolite becomes a high-level radiation disposal waste. In step 114, any spent zeolite is replaced with appropriate fresh zeolite material, or zeolite material having a lower (less than 9,000 pCi/g) amount of radium absorbed thereto.

Figure 2:
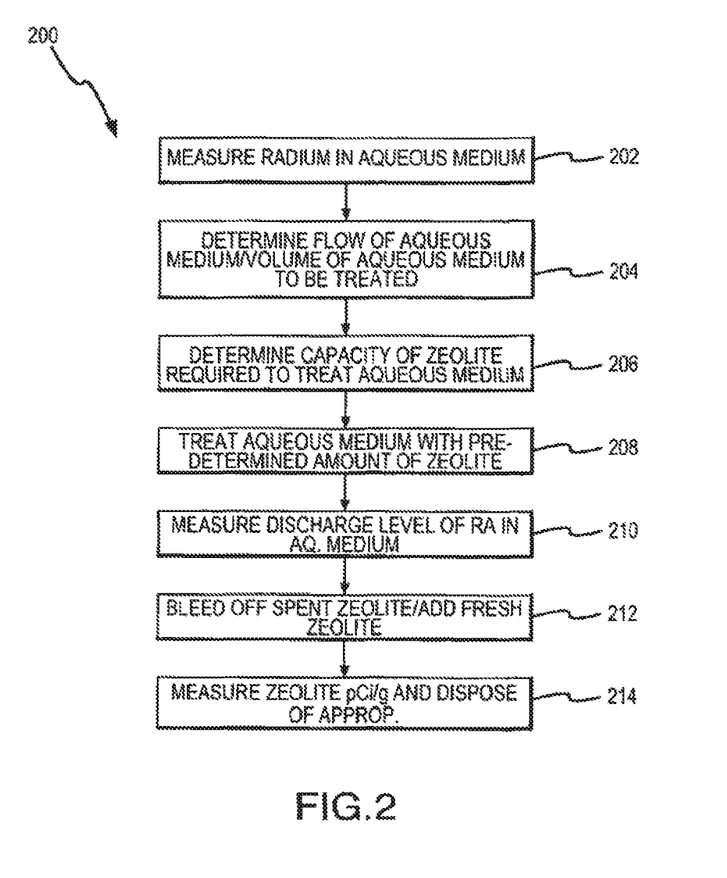
FIG. 2 illustrates a flow diagram of a method for removing radium from an aqueous media in accordance with another embodiment of the present invention.

Referring to FIG. 2, a flow diagram of another method 200 for the removal of radium from aqueous media is shown (note that steps 202, 204 and 206 are interchangeable in relation to each other). In step 202, the level of radium is measured in the aqueous media feed to determine a first level of radium. In steps 204 and 206, a determination is made as to the aqueous media flow and/or total volume of aqueous media to be treated by the zeolite of the present invention, as well as a determination as to the amount and capacity of zeolite required to treat the aqueous media to reach a pre-determined discharge level of radium. In preferred embodiments, the determination steps 204 and 206 are made so that the second of third or discharge level of radium is slightly below a threshold value, for example the MCL for radium in drinking water. Note that these steps include a determination of whether to bypass the zeolite contact step (step 208) with a portion of the aqueous media at the first level of radium. This allows for a mixing of a portion of aqueous media at a first level with treated aqueous media having a radium content at a second level, providing the discharge level of radium. In step 208, the determined flow of aqueous media is placed in contact with the determined amount of zeolite for a sufficient amount of time to remove a pre-determined amount of radium, preferably so that the radium is present in the discharge at levels below a target threshold, for example the MCL for radium in the United States. In step 210, the discharge level of radium in the aqueous media is measured and is preferably compared to the first and second levels of radium in the aqueous media.

In step 212, a portion of the spent zeolite is bled away from the aqueous media and replaced with an equal amount of fresh zeolite. In step 214, the spent zeolite is measured for radium content and disposed of in either a low-level radioactivity facility or a high-level radioactivity facility, depending on the pCi/g of the material. In some cases, where the spent zeolite has an appropriate radium level, the zeolite can be re-used in the treatment of aqueous media, and is added to the zeolite in step 212, replacing fresh zeolite. Note also that the preferable disposal method is to dispose of the spent zeolite at approximately 9,000 pCi/g at a low-level waste site.

Figure 3:
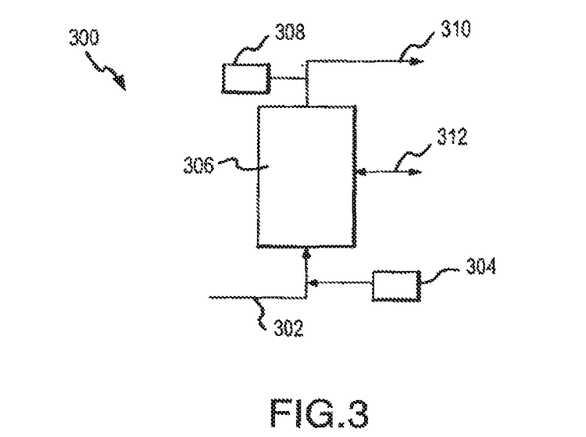
FIG. 3 illustrates a system for removing radium from an aqueous media in accordance with an embodiment of the present invention.

Referring to FIG. 3, a system 300 for the removal of radium from aqueous media is shown. An aqueous media having a first level of radium is provided 302, preferably of a ground or surface water source, and most preferably a water source as it enters a water treatment facility, for example, as it enters a drinking water treatment facility. The system preferably has a radium monitoring device for measuring the radium content to provide an approximate or average first level radium value 304. The aqueous media is fed into an absorption column or tank charged with a zeolite material 306. Note that the zeolite is typically pre-treated to remove fines by mixing the zeolite with water in an attrittor trommel, or industrial sized blender and the fines removed from the appropriately sized zeolite. The absorption column can operate as a fixed bed, fluidized bed, or stirred reactor, all of which are known within the art (a bed volume for purposes of the present invention is the volume of zeolite in a column or to the retention/specific retention volume of the zeolite).

In preferred embodiments, from 8 to 9 feet of zeolite material, housed in a 12×12 housing member, for example a tank or column, is used to treat one million gallons of water per day. Flow rate is adjusted to correspond to the zeolite depth, column size, zeolite size, etc. (See Examples below for further illustrations).

The fed aqueous media contacts the zeolite. The contact may be batch, i.e., aqueous media is added to the column, agitated/stirred, and removed, or continuous, where the aqueous medium is fed to the column inlet and passed through the column (via an up- or down-flow type technique) through the zeolite and out an outlet. In preferably embodiments, the aqueous medium is fed through the column using an up-flow configuration.

The system illustrated in FIG. 3 further shows a second radium measuring device for measuring the radium level on the discharge from the column 308. The aqueous medium contains radium at a second, lower level of radium from the first level of radium 310. Finally, the system includes the capability of removing and adding zeolite to the column when appropriate 312. For example, once the zeolite is "loaded," e.g., contains levels of radium approaching, but less than, 10,000 pCi/g, it is removed from the column/tank and disposed of through standard practices for treatment of low-level waste. The spent zeolite material is then replaced with fresh zeolite material. While it is less desirable economically, the spent zeolite material can be refreshed by known processes, such as passing the material through a brine containing cations of, for example, sodium, potassium, and/or calcium. While this refreshing step will work, it generally leads to the production of more concentrated radium high-level waste which is less desirable from a radium disposal standpoint. Spent zeolite can be removed from the zeolite housing members of the present invention by vacuum or other like method. In a preferred embodiment, a vacuum truck having a holding tank is used to pull the spent zeolite out of the housing member and the spent zeolite is allowed to "dry out" for disposal (the material must pass a point filter, or other like, test before disposal in a low-level waste site). Note also that in some embodiments the entire housing member can be replaced with a new housing member charged with zeolite. The removed housing member is then disposed of appropriately, or cleared of "spent" zeolite, and recharged with fresh zeolite for later use within the system (i.e., the next time a housing member is replaced).

In an alternative to physically monitoring the second level or radium in the aqueous media, or to monitoring the radium content of the zeolite, an estimation of the number of bed volumes required to achieve a desired reduction in radium concentration in the aqueous media can be made, and the flow of the aqueous medium through the column measured instead, i.e., as illustrated by a radium loading matrix. In this sense standard flow meters can be utilized within the system for monitoring water flow. This estimation is a calculation based on the particular aqueous medium composition, the zeolite absorption properties, the desired reduction in radium concentration, the column size, the facility capacity, and the anticipated aqueous medium flow rate. Table 3 illustrates a radium loading matrix in accordance with the present invention.

TABLE 3

Radium Loading Matrix
ONE CUBIC FOOT OF WRT Z-88, 50 lbs, 22,697 grams
9 GALLONS PER MINUTE PER SQUARE FOOT, 34.7 lpm

| Target pCi/g of Spent Zeolite | Feed pCi/L: 10 | Feed pCi/L: 15 | Feed pCi/L: 20 |
| --- | --- | --- | --- |
| 1,000 pCi/g | 1.5 months | 1.0 months | 0.8 months |
| 2,000 pCi/g | 3.0 | 2.0 | 1.5 |
| 3,000 pCi/g | 4.5 | 3.0 | 2.3 |
| 4,000 pCi/g | 6.1 | 4.0 | 3.0 |
| 5,000 pCi/g | 7.6 | 5.0 | 3.8 |
| 6,000 pCi/g | 9.1 | 6.1 | 4.5 |
| 7,000 pCi/g | 10.6 | 7.1 | 5.3 |
| 8,000 pCi/g | 12.1 | 8.1 | 6.1 |
| 9,000 pCi/g | 13.6 | 9.1 | 6.8 |
| 10,000 pCi/g | 15.1 | 10.1 | 7.6 |

It should be noted that the radium content of the aqueous medium can be followed by monitoring another characteristic property in the aqueous medium that is correlated with the level of radium in the medium. For example, the radium content exiting the column is an excellent indicator of the content of radium absorbed to the zeolite. As such, when the second level of radium exceeds the targeted threshold value, for example the MCL, or an anticipated number of bed volumes is reached, "breakthrough" occurs. Breakthrough indicates that a partial or complete exchange of the zeolite in the column is required to maintain the contemplated radium removal levels in the discharged aqueous medium.

Figure 4:
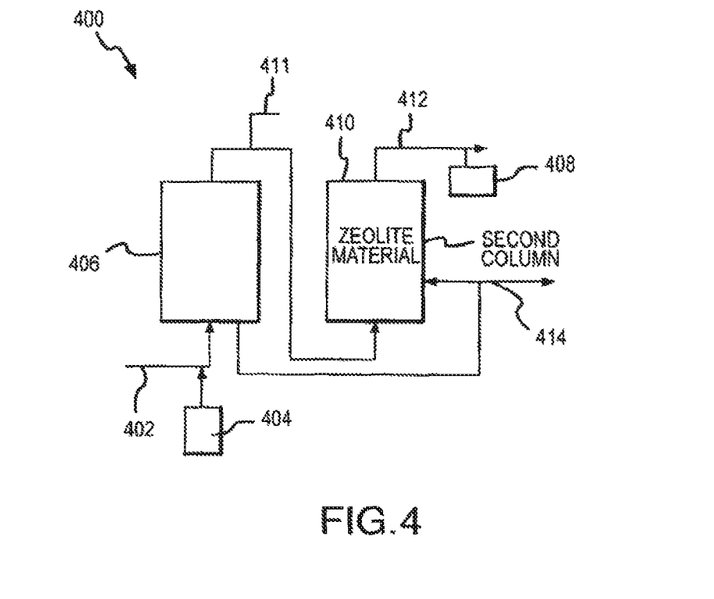
FIG. 4 illustrates a system for removing radium from an aqueous media in accordance with another embodiment of the present invention.

FIG. 4 illustrates another embodiment of the present invention where a system 400 for the removal of radium is shown. Like the previous embodiment (see FIG. 3) the system includes an aqueous media having a first level of radium 402, a radium monitoring device for measuring the radium content to provide an approximate or average first level radium value 404, a first absorption column or tank charged with a zeolite material 406, and a second radium measuring device for measuring the radium level on the discharge 408. In this manner, the system is essentially the same as the system shown in FIG. 3. However, the system in FIG. 4 illustrates a second absorption column or tank charge with a zeolite material 410. The types of zeolite in the first and second absorption columns can be the same or different dependent on the needs of the system. As such, aqueous medium having a first level of radium enters the first column of zeolite and exits having a second level of radium 411. The medium then travels to the second column of zeolite and exits this column with a third level of radium 412. The second level of radium is lower than the first level of radium and the third level of radium is lower than the second level of radium.

In preferred embodiments, two separate portions of zeolite, from 8 to 9 feet of material per portion, housed in two separate 12×12 housing members, for example tanks or columns, can be used to treat a one million gallon flow of water per day. Note also that the two 8 to 9 feet portions of zeolite can be housed in a single housing member, where the housing member has a partition between each portion and adequate fluid communication between the separately housed portions of zeolite.

In all other manners the system shown in FIG. 4 is similar to the system shown in FIG. 3, for example once the zeolite is "loaded," e.g., contains levels of radium approaching, but less than, 10,000 pCi/g, in one of the two columns, it is removed from the column/tank and disposed of through standard practices for treatment of low-level waste 414. As above, the spent zeolite can be bled or removed in whole from one or both of the columns, as required and is typically replaced for farther use of the system. Alternatively, one or both of the columns can be replaced with new columns charged with fresh zeolite. Note that in some embodiments the flow is directed through the two columns in-parallel.

Figure 5:
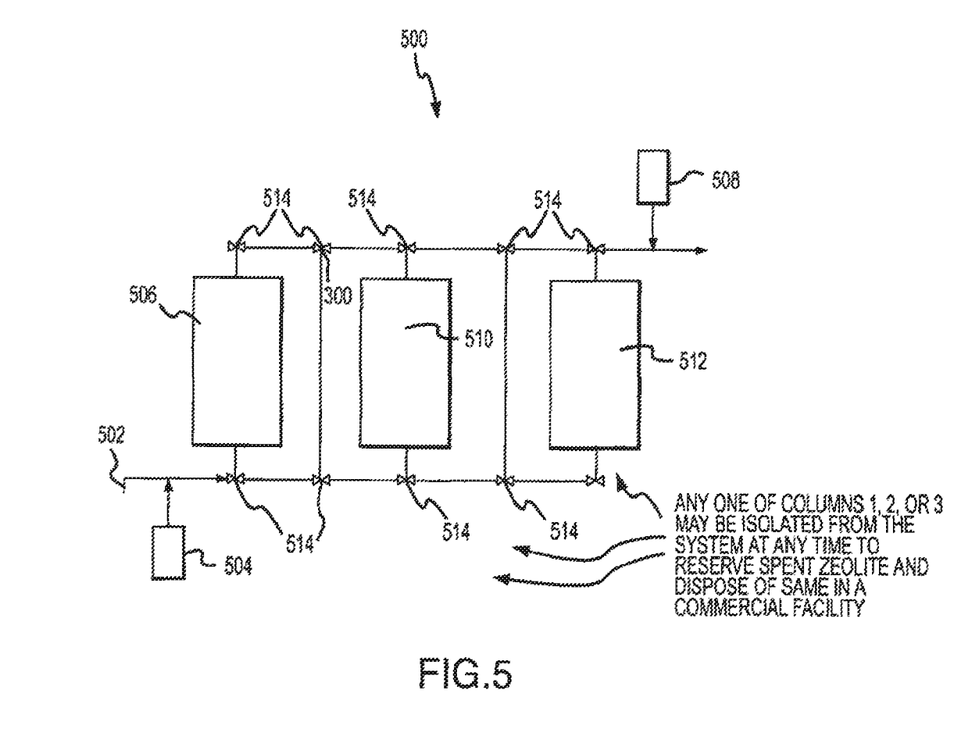
FIG. 5 illustrates a system for removing radium from an aqueous media in accordance with another embodiment of the present invention.

FIG. 5 illustrates another embodiment of the present invention where a system 500 for the removal of radium is shown. Like the previous embodiments (see FIGS. 3 and 4) the system includes an aqueous media having a first level of radium 502, a radium monitoring device for measuring the radium content to provide an approximate or average first level radium value 504, a first absorption column or tank charged with a zeolite material 506, and a second radium measuring device for measuring the radium level on the discharge 508. In this manner, the system is essentially the same as the system shown in FIG. 3. However, the system in FIG. 5 illustrates a second and third absorption columns or tanks charge with zeolite material, 510 and 512. The zeolite in the first, second and third absorption columns can be the same or different dependent on the needs of the system. As such, aqueous medium having a first level of radium enters the first column of zeolite and exits having a second level of radium. The medium then travels to the second column of zeolite and exits this column with a third level of radium. The second level of radium is lower than the first level of radium and the third level of radium is lower than the second level of radium. In addition, the system shown in FIG. 5 allows for the switching of the aqueous medium through any two of the three columns, via valves 514, to lower the radium level to a second level and third level regardless of the two tanks of material in use.

The incorporation of a third zeolite housing member allows for one of the three tanks to be out of use during radium removal from the aqueous medium. For example, a tank 506, 510 or 512 may require maintenance or may need a change in zeolite, from spent to fresh, and require that the tank be taken off line from the other two tanks. The two remaining tanks operate as described in FIG. 4, while the third tank is non-operational. Once the non-operational tank is placed back on-line, one of the other two tanks can be taken off line and appropriate action taken. Note also that the flow can be sent through the three housing members in-parallel (as opposed to in-series) dependent on the needs of the system.

It is envisioned that all three tanks could be in simultaneously use where the radium levels require additional capacity for removal of radium (in-parallel or in-series).

Systems for Monitoring and Disposing of Radium from an Aqueous Medium

The present invention contemplates a system for operating the equipment required to remove radium from a target water source by an off-site provider, for example a company that specifically installs, monitors, trouble-shoots, and disposes of the zeolite materials in the tanks/columns of the present invention. The off-site provider is contemplated to be hired by a municipality (or other like governmental or private water board) to maintain the radium levels in the municipalities water via the systems and methods of the present invention. The off-site provider is responsible for determining the radium removal requirements of the target water source, for example, discharge water from a water treatment facility, including the type and amount of zeolite required, the number of tanks necessary to house the zeolite, the design of the flow through the tanks, i.e., up-flow, down-flow, batch, in-series, in-parallel, the flow rate of the aqueous medium, the length of time before disposal, and the spent zeolite disposal site.

The off-site provider installs the columns containing the properly charged zeolite materials at the water treatment facility and monitors the first level, second level, discharge level, etc of the radium in the water, and of the radium levels in the zeolite in the column(s). The radium monitoring can be technician based, i.e., a technician goes to the installed system and takes readings on the samples, or can be performed by a preprogrammed radium monitoring unit that transmits the radium levels to an off-site monitoring unit, for example a computer, or via a wireless communication system. The off-site monitoring unit can be equipped with a signaling means for alerting the off-site provider of over target radium levels for the discharge, as well as for the radium levels of the zeolite, so that the radium levels in the zeolite can be maintained below approximately 9,000 to 10,000 pCi/g. In one embodiment, the off-site provider has the capability of diverting the water supply from one source of zeolite to a second source of zeolite, when the provider receives a signal that the first source of zeolite is at a threshold value for radium (the value that requires the zeolite to be disposed of at a high-level waste site).

The off-site provider is responsible for coordinating any maintenance or trouble-shooting issues that arise during the radium removal process. As such, alarms or other signaling devices may be included in the zeolite housing members to alert the provider of a potential malfunction in the system. Further, the off-site manager is responsible for the replacement and disposal of used or spent zeolite, and in particular is responsible for the disposal of the spent zeolite at a low-level radioactivity waste site. As such, the municipality does not have to dispose of a radioactive material.

As such, an off-site provider of the present invention can be hired by the manager of the water source to operate the radium removal and disposal system and remove and dispose of the radium from the water source independently of the manager's duties. In one embodiment, the off-site provider is an independent contractor specializing in the systems and methods of the present invention. In preferred embodiments, the off-site provider operates a plurality of radium removal and disposal systems at a number of different sites for a number of different water management groups, for example, for a number of municipal water boards. The off-site provider would have a financial and technological advantage for radium removal and disposal over the managers. These sites could be located throughout the United States or the world.

In other embodiments, the off-site provider compiles data from its different radium removal and disposal systems to optimize radium removal and disposal at existing and potentially new sites. This data includes the basic parameters of the system: pH, capacity of zeolite, flow rate, type of zeolite, amount of zeolite, etc.

Finally, the systems and methods of the present invention provide business methods for an off-site provider to remove and dispose of radium from public or private water supplies, as managed by other third parties. The business methods provide economic and technological advantages to the third party for removing and disposing radium.

Having generally described the invention, the same will be more readily understood by reference to the following examples, which are provided by way of illustration and are not intended as limiting.

EXAMPLES

Example I: Zeolite Effectively Removes Radium from Aqueous Media

Radium assay procedures on target samples was performed by Hazen Research, Inc., located at 4501 Indiana St., Golden, Colo. Assays relating to iron, magnesium, calcium, and sodium were performed by Commercial Testing & Engineering Mineral Laboratory, located at 4906 McIntyre St, Golden, Colo., which were in accordance with Environmental Protection Agency protocol number, EPA 6010.

The results shown below utilized the following generalized protocol: Five hundred grams of zeolite (20×40 mesh) was placed in an adequately sized container. Hot water (approximately 7.5 liters) was added to the container and the mixture mechanically mixed for approximately thirty minutes. The zeolite was then allowed to settle and the water decanted (this removed some of the suspended clays and zeolite fines). A second volume of water was added to the zeolite, remixed and decanted as above. The settled zeolite was removed and dried at a low temperature (35 to 50° C.) and then dried, and sieved on a 35- to 40-mesh screen to remove any remaining fines.

The sieved and dried zeolite was added to a 100- to 250-ml chromatographic column, although a 100- to 250-ml dispensing buret could have also been used. If a buret is used, insect a small wad of glass wool into the buret and push to the bottom prior to adding the zeolite. A solution reservoir was connected to the column bottom using a peristaltic or other low-capacity pump and flexible tubing. A one-hole rubber stopper was fitted into the top of the column and fitted with a flexible tubing to handle the column discharge.

A radium containing aqueous medium was pumped slowly up-flow through the zeolite column and the discharge collected for analysis. The flow of the aqueous medium was adjusted to provide a desired contact time with the zeolite, preferably the contact time was from five to ten minutes.

Figure 6:
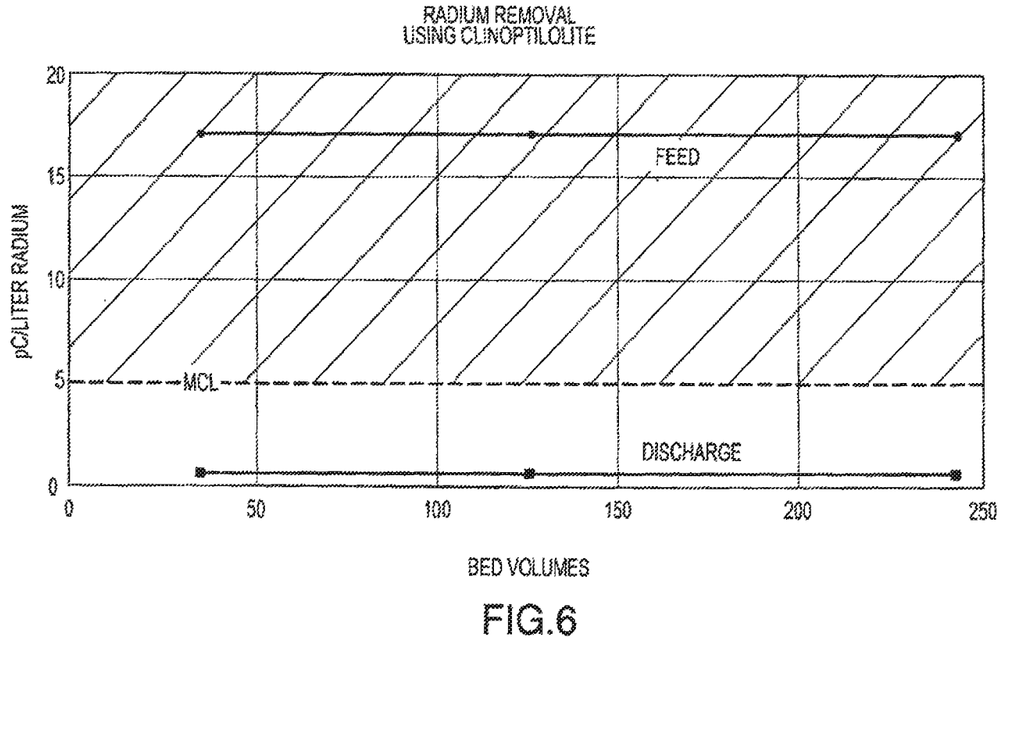
FIG. 6 graphically shows the feed and discharge levels of radium removal using an embodiment of the present invention.

The data shown in FIG. 6 illustrates bed volumes treated versus combined Radium-226 and Radium-228 in the feed and discharge. The aqueous medium was passed through the column at a flow rate of between 4 and 5 cubic centimeters per minute (for purposes of FIG. 6, 50 grams of zeolite was prepared and added to the column). As such, the 50 grams of zeolite, having a specific density of 0.8, had a bed volume of 50/0.8 or 62.4 cc per bed volume. The bed volume divided by the average flow rate yields the requisite minutes per bed volume. This conversion was used to calculate the bed volumes at the sample time at the end of each sample period. Therefore, at the and of eight hours, 480 minutes divided by 13.9 minutes per bed volume, yields 34.6 bed volumes.

FIG. 6 shows that the feed concentration of radium was between 15 and 20 pCi/L, while the discharge concentration was on average less than 0.4 pCi/L. The water feed contained approximately 115 pCi/L gross alpha radium, 19 pCi/L of Radium-226, 20 pCi/L or Radium-228, 31 mg/L of Ca, 23 mg/L Mg, 223 mg/L Na, 10 mg/L K and 9 mg/L Fe. An analyzed sample taken from 2.5 to 8.5 hours after the beginning of the test reveals that only 0.2 pCi/L Radium-226 and 0.3 pCi/L Radium-228 remained in the discharged medium.

Note that nearly 50% of the radium was removed from the aqueous medium through co-precipitation with ferric hydroxide. Radium removed by co-precipitation with iron yields a high-level radium waste and should be avoided if possible. Typically, oxidation sources, such as oxygen, must be kept away from the aqueous medium prior to contacting with zeolite.

Example II: Zeolite can be Used to Remove Radium from Aqueous Medium in an Industrial Scale Setting The amount of zeolite and the size of the tarik(s) for commercial applications are selected based on numerous design parameters, including but not limited to, average amount of radium in the aqueous medium, desired levels of reduction in concentration of radium, plant capacity, and type of zeolite.

Predictable scale-up for the methods according to the present invention are described to a theoretical one million gallon per day treatment facility. The zeolite is assumed to be 8×20 mesh clinoptilolite. The aqueous medium is assumed to contain an average of 10 pCi/L in radium (i.e., the first level) and the desired reduction in concentration is 80%, i.e., to a second level (or discharge level) of less than 2 pCi/L. The flow-rate is assumed to be 20 gal/sq.ft.

A typical scale-up calculation for design of the industrial capacity system for one million gallon discussed above might include, removal of 8 pCi/L of solution for a one million gallon per day facility, requiring removal of more than 30 million pCi of radium per day. Since the zeolite is limited to approximately 9,000 pCi/g (allowing for 1,000 pCi/g safety margin on disposal), this results in a requirement of 2,739 pounds of zeolite per year.

Using a flow rate of 20 gal/square foot/minute and 8×20 mesh zeolite, the tank requirements are 7 ft. diameter and at least 3 feet in height (using a safety factor of 5). Therefore, the present industrial scale system should remove adequate levels of radium from an aqueous medium for an entire year prior to removal and disposal of the loaded zeolite. The loaded zeolite will be removed at levels less than 10,000 pCi/g, and therefore can be disposed of as low-level waste material.

Example III: Radium Removal Pilot Systems

A test unit having eight 4 inch diameters×4 feet tall columns, loaded with approximately 4 feet zeolite, and in accordance with the present invention, were connected to a source of water having a flow rate of 0.6 to 0.8 gallons per minute, at 10 pounds per square inch (psi). A totalizing flow meter was equipped onto each of the eight columns. Note that two separate pilot systems were utilized, one at Medina, Minn. and the other in Oswego, Ill., and data is shown below for each (Tables 4 and 5). The flow rate was chosen to harmonize with bed expansion, so that the zeolite beds expanded to approximately six inches below the safety screen in each column.

Samples treated by the pilot system were taken on a schedule as shown below. Note that when samples were obtained from the system, an inline filter was used and the sample lines were purged. Note also that, due to cost efficiency constraints, only specific columns were evaluated over the course of the pilot systems.

TABLE 4

Medina, Minnesota Radium Data

| Day | Flowmeter Reading | Feed | Col. 1 | Col. 2 | Col. 3 | Col. 4 | Col. 5 | Col. 6 | Col. 7 | Col. 8 |
|---|---|---|---|---|---|---|---|---|---|---|
| | | | | | Radium-228 | | | | | |
| 1 | 423 | 5.2 | | | | | 0.0 | | | 0.0 |
| 2 | 2,158 | | | | | | | | | |
| 5 | 4,448 | | | | | | | | | |
| 7 | | | | | | | | | | |
| 9 | | | | | | | | | | |
| 12 | | | | | | | | | | |
| 14 | | | | | | | | | | |
| 16 | | | | | | | | | | |
| 19 | | | | | | | | | | |
| 21 | | | | | | | | | | |
| 23 | | | | | | | | | | |
| 26 | 2,171 | | | | | | | | | |
| 28 | 3,980 | | | | | | | | | |
| 33 | 9,014 | | | 9.2 | | | | | | 0.6 |
| 40 | 14,143 | | | | | | | | | |
| 42 | 15,054 | | | | | | | | | |
| 44 | 17,144 | | | | | | | | | |
| 47 | 20,166 | | | | | | | | | |
| 49 | 22,338 | | | | | | | | | |
| 51 | 24,656 | | | | | | | | | |
| 54 | 27,901 | | | | | | | | | |
| 56 | 29,658 | | | | | | | | | |
| 58 | | | 1.5 | | | | | | | 0.3 |
| | | | | | Radium-226 | | | | | |
| 1 | 423 | 3.4 | | | | | 0.4 | | | 0.1 |
| 2 | 2,158 | | | | | | | | | |
| 5 | 4,448 | | | | | | | | | |
| 7 | | | | | | | | | | |
| 9 | | | | | | | | | | |
| 12 | | | | | | | | | | |
| 14 | | 3.6 | | 0.2 | | | 0.2 | | | 0 |
| 16 | | | | | | | | | | |
| 19 | | | | | | | | | | |
| 21 | | | | | | | | | | |
| 23 | | | | | | | | | | |
| 26 | 2,171 | | | | | | | | | |
| 28 | 3,980 | | | | | | | | | |
| 33 | 9,014 | | | 1.2 | 0.1 | | 0.3 | | | |
| 40 | 14,143 | | | | | | | | | |
| 42 | 15,054 | | | | | | | | | |
| 44 | 17,144 | | | | | | | | | |
| 47 | 20,166 | | | | | | | | | |
| 49 | 22,338 | | | | | | | | | |
| 51 | 24,656 | | | | | | | | | |
| 54 | 27,901 | | | | | | | | | |
| 56 | 29,658 | | | | | | | | | |
| 58 | | | 1.2 | | | 0.0 | | | | 0.4 |

TABLE 5

Oswego, Illinois Radium Data

| Day | Flowmet. Reading | Feed | Col. 1 | Col. 2 | Col. 3 | Col. 4 | Col. 5 | Col. 6 | Col. 7 | Col. 8 |
|---|---|---|---|---|---|---|---|---|---|---|
| | | | | | Radium-228 | | | | | |
| 1 | | 6.9 | | | | | | | | 0.2 |
| 3 | 3,511 | | | | | | | | | |
| 5 | 5,824 | | | | | | | | | |
| 7 | 8,249 | | | | | | | | | |
| 10 | 11,743 | | | | | | | | | |
| 12 | 14,236 | | | | | | | | | |
| 14 | 16,632 | 65 | | 17.0 | | | | | | |

TABLE 5-continued

Oswego, Illinois Radium Data

| Day | Flowmet. Reading | Feed | Col. 1 | Col. 2 | Col. 3 | Col. 4 | Col. 5 | Col. 6 | Col. 7 | Col. 8 |
|---|---|---|---|---|---|---|---|---|---|---|
| 17 | | | | | | | | | | |
| 19 | 22,857 | | | | | | | | | |
| 21 | 25,259 | | | | | | | | | |
| 24 | 28,784 | | | | | | | | | |
| 26 | 31,263 | | | | | | | | | |
| 28 | 33,576 | | | | | | | | | |
| 31 | 37,106 | | | | 0.7 | | | | | |
| 33 | 39,377 | | | | | | | | | |
| 35 | 41,896 | | | | | | | | | |
| 38 | | | | | | | | | | |
| 40 | 48,298 | | | | | | | | | |
| 42 | 50,595 | | | | | | | | | |
| 45 | 53,488 | | | | | | | | | |
| 47 | 56,092 | | | | | | | | | |
| Radium-226 | | | | | | | | | | |
| 1 | | 8.6 | | | | | | | | 0.7 |
| 3 | 3,511 | | | | | | | | | |
| 5 | 5,824 | | | | | | | | | |
| 7 | 8,249 | | | | | | | | | |
| 10 | 11,743 | | | | | | | | | |
| 12 | 14,236 | | | | | | | | | |
| 14 | 16,632 | 19.0 | | 16.0 | | | 5.5 | | | 0.7 |
| 17 | | | | | | | | | | |
| 19 | 22,857 | | | | | | | | | |
| 21 | 25,259 | | | | | | | | | |
| 24 | 28,784 | | | | | | | | | |
| 26 | 31,263 | | | | | | | | | |
| 28 | 33,576 | 7.8 | 1.8 | | 2.2 | | | | | 0.1 |
| 31 | 37,106 | | | | | | | | | |
| 33 | 39,377 | | | | | | | | | |
| 35 | 41,896 | | | | | | | | | |
| 38 | | | | | | | | | | |
| 40 | 48,298 | | | | | | | | | |
| 42 | 50,595 | | 6.1 | | | | | | | |
| 45 | 53,488 | | | | | | | | | |
| 47 | 56,092 | | | | | | | | | |

The data in Tables 4 and 5 illustrate the utility of the present invention for treating, i.e., removing and disposing, of large volumes of water and providing a MCL compliant water source for use in a commercial setting.

As such, the present invention provides systems and methods for the removal of radium from an aqueous medium. The invention utilizes zeolite materials and targets the materials capacity to absorb less than 9,999 pCi/g radioactivity for disposal in low-level radioactivity waste site.

It is understood for purposes of this disclosure, that various changes and modifications may be made to the invention that are well within the scope of the invention. Numerous other changes may be made which will readily suggest themselves to those skilled in the art and which are encompassed in the spirit of the invention disclosed herein and as defined in the appended claims.

What is claimed is:

1. A system for removing radium from a flowing source of water comprising:
   a flowing source of water;
   a plurality of natural zeolite containing housing members, each housing member having a first end for receiving the flowing source of water and a second end for discharging the water;
   a first conduit system connecting the first ends of the housing members together;
   a second conduit system connecting the second ends of the housing members together;
   a third conduit system connecting the first conduit system and the second conduit system; and
   a plurality of valves positioned in the first, second and third conduit systems for directing the flow of water between the plurality of housing members,
   wherein:
   the plurality of valves are configured to direct the flowing source of water through the first end of a first natural zeolite containing housing member of the plurality of natural zeolite containing housing members, and exits at the second end of the first natural zeolite containing housing member, wherein the natural zeolite in the first housing member absorbs a first level of radium from the flowing source of water,
   the plurality of valves are configured to direct the flowing source of water through the first end of a second natural zeolite containing housing member of the plurality of natural zeolite containing housing members, and exits at the second end of the second natural zeolite containing housing member, wherein the natural zeolite in the second housing member absorbs a second level of radium from the flowing source of water,
   the second level of radium is lower than the first level of radium,
   the natural zeolite is clinoptilolite or chabazite, and
   the flowing source of water is drinking water.

2. The system of claim 1, wherein the housing members are columns.

3. The system of claim 1, wherein the flowing source of water flows upwardly through the first natural zeolite containing housing member.

4. The system of claim 1, wherein the flowing source of water flows upwardly through the second natural zeolite containing housing member.

5. The system of claim 1, wherein the natural zeolite in the first housing member can be replaced while the flowing water is treated by the natural zeolite in the second housing member.

6. The system of claim 1, wherein the natural zeolite in the second housing member can be replaced while the flowing water is treated by the natural zeolite in the first housing member.

7. A system for removing radium from a flowing source of water comprising:
- a flowing source of water;
- two or more natural zeolite containing housing members, each housing member having a first end for receiving the flowing source of water and a second end for discharging the water;
- a first conduit system connecting the first ends of the housing members together;
- a second conduit system connecting the second ends of the housing members together;
- a third conduit system connecting the first conduit system and the second conduit system; and
- a plurality of valves positioned in the first, second and third conduit systems for directing the flow of water between the two or more natural zeolite containing housing members, wherein:
the plurality of valves are configured to direct the flowing source of water through the first end of a first of the two or more natural zeolite containing housing members, and exits at the second end of the first natural zeolite containing housing member, wherein the natural zeolite in the first natural zeolite containing housing member absorbs a first level of radium from the flowing source of water, the plurality of valves are configured to direct the flowing source of water through the first end of a second of the two or more natural zeolite containing housing members, and exits at the second end of the second natural zeolite containing housing member, wherein the natural zeolite in the second natural zeolite containing housing member absorbs a second level of radium from the flowing source of water, the second level of radium is lower than the first level of radium, the natural zeolite is clinoptilolite or chabazite, and the flowing source of water is drinking water.

8. The system of claim 7, wherein the housing members are columns.

9. The system of claim 7, wherein the flowing source of water flows upwardly through one of the two or more natural zeolite containing housing member.

10. The system of claim 7, wherein the flowing source of water flows through an adjacent natural zeolite containing housing member.

11. The system of claim 7, wherein one or more of the natural zeolite containing housing members is configured for removal from the system when the natural zeolite is loaded and ready for disposal at a low level radioactive waste facility.

* * * * *